Patented Sept. 29, 1953

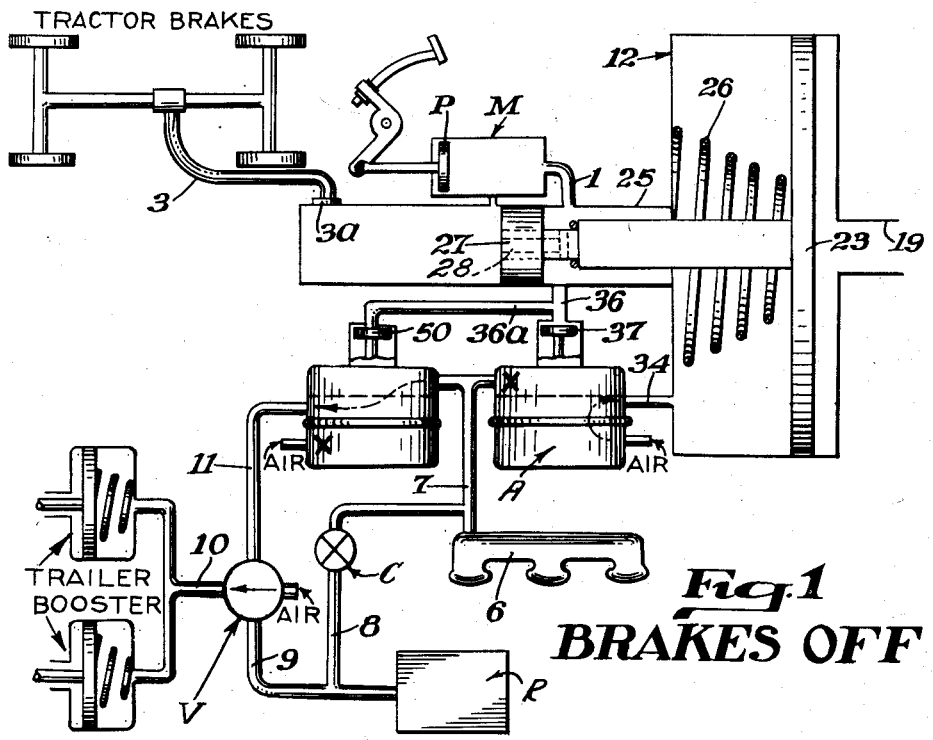

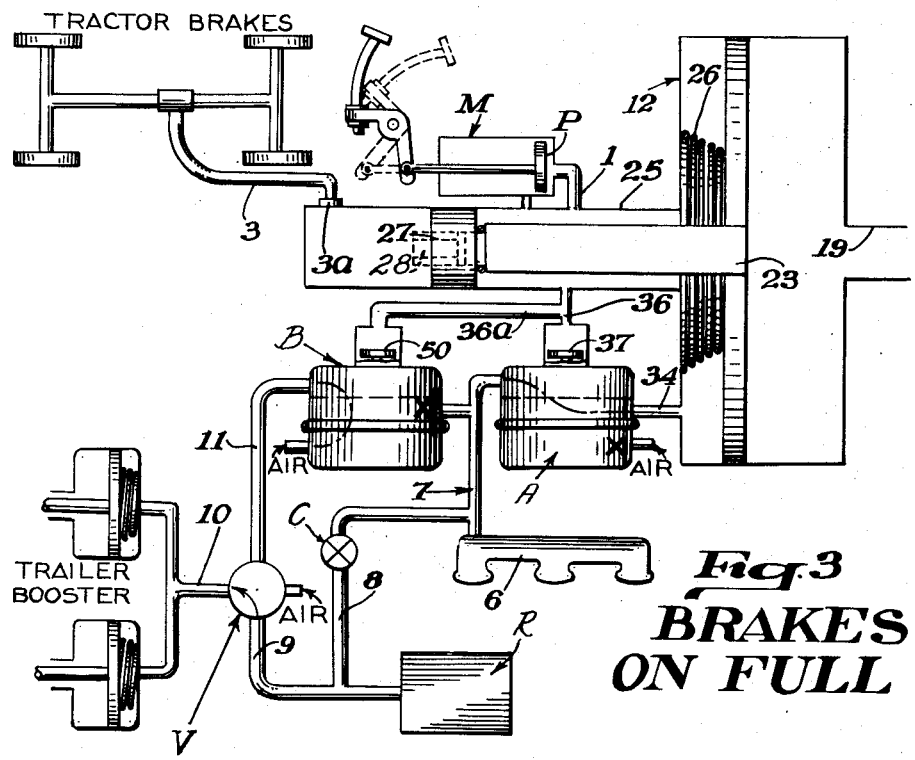

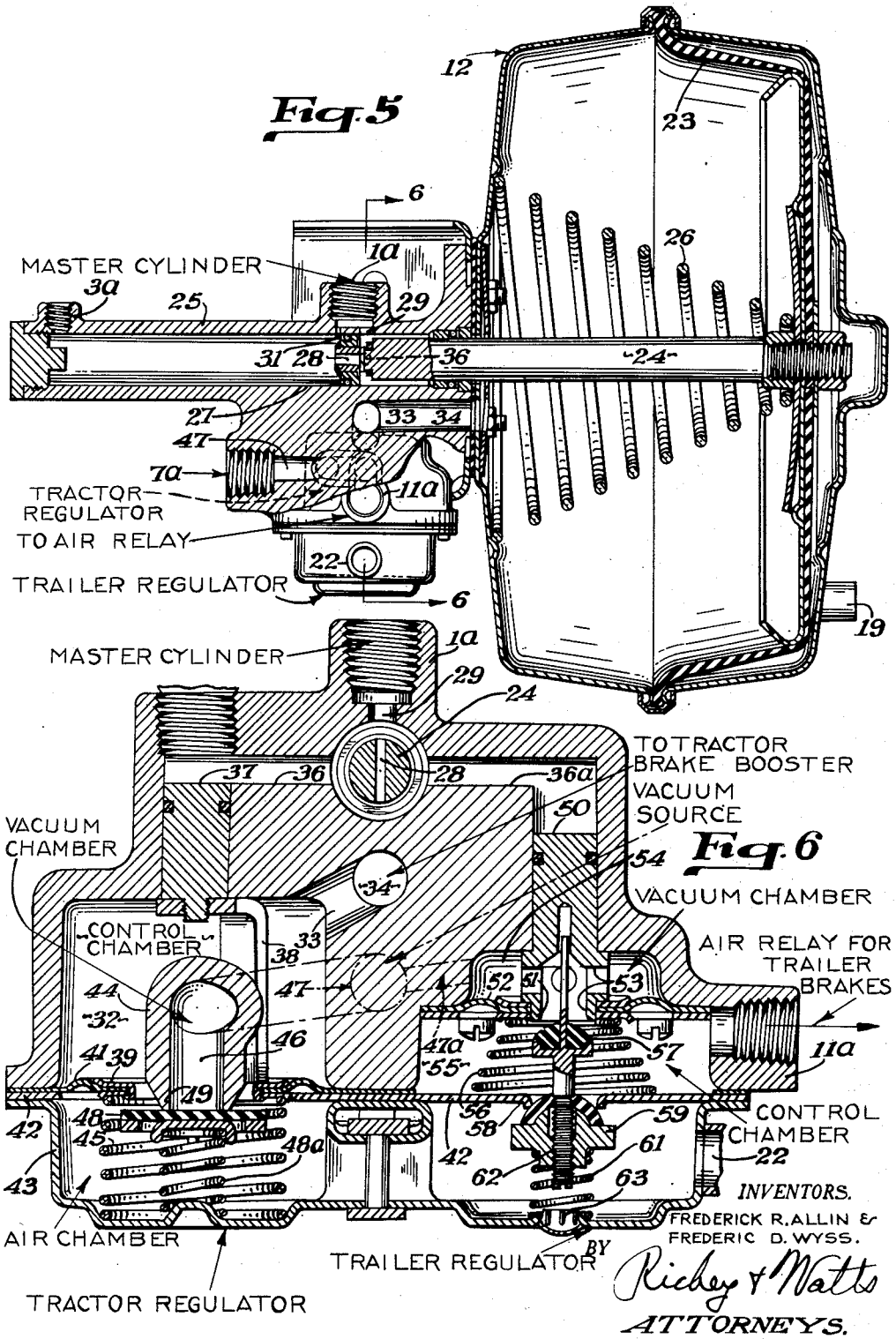

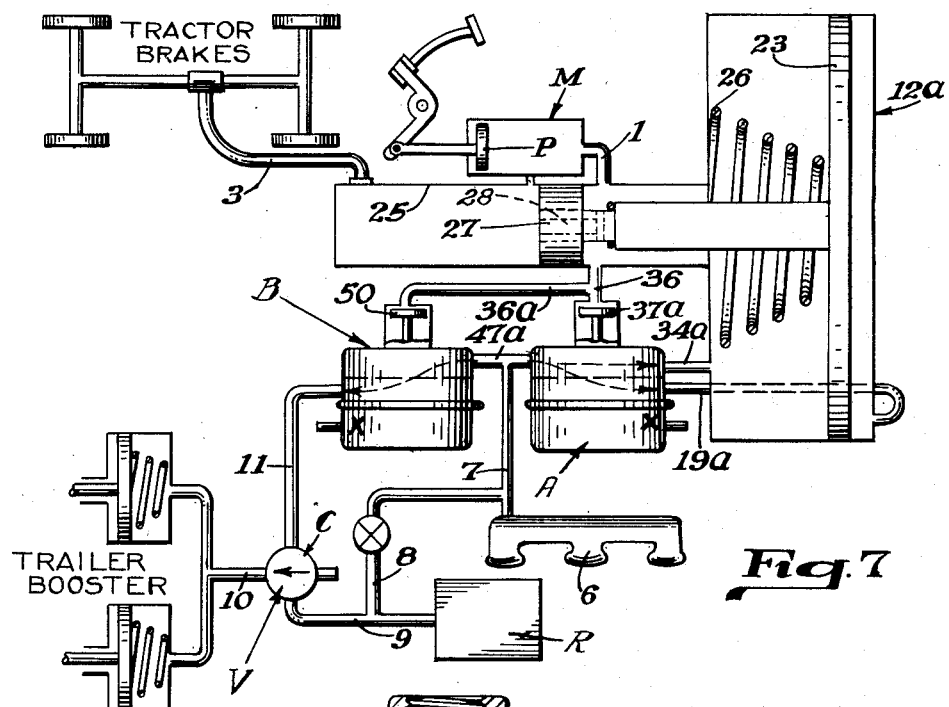
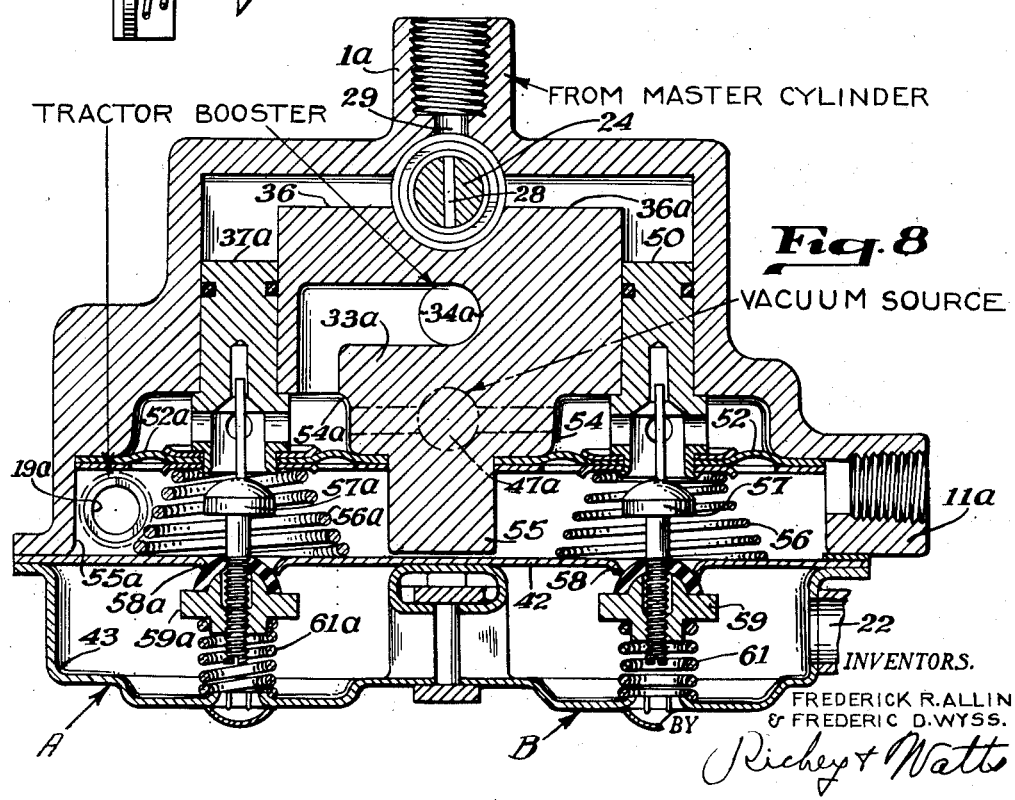

2,653,680

UNITED STATES PATENT OFFICE 2,653,680

TRACTOR-TRAILER BRAKE PROPORTIONING COMBINATION

Frederick R. Allin, Euclid, and Frederic D. Wyss, Cleveland Heights, Ohio, assignors to The Weatherhead Company, Cleveland, Ohio, a corporation of Ohio Application June 16, 1948, Serial No. 33,348

12 Claims. (Cl. 188—3)

This invention relates to booster brakes and, more particularly, to a tractor and trailer brake system controlled by a single master cylinder in the tractor arranged so that upon application of the brakes, the trailer brake booster is energized ahead of the tractor booster.

In modern tractor and trailer installations it is customary to have vacuum or air booster brakes fitted to both the tractor and the trailer, both sets of brakes being controlled from the single brake pedal in the tractor. As is well known in the art, many such systems are subject to an action known as "jackknifing" which results from the delay and inertia factors in the trailer system due to the remoteness of the trailer system from the controlling tractor system, which delay causes trailer brake application to lag application of the tractor brakes.

It is an object of the present invention to eliminate the possibilities of "jackknifing" under single pedal control by causing application of the trailer brakes to positively lead application of the tractor brakes, but, at the same time, permitting full application of both sets of brakes after a certain pedal pressure has been achieved.

Another object resides in accomplishing the results referred to without requiring the introduction of complicated and expensive proportioning valves in the line and without requiring the employment of specialized relay valves for accelerating the action of the trailer brakes relative to the tractor brakes. In fact, when employed in connection with vacuum suspended brakes, the relay valve may be dispensed with and the discrimination in favor of the trailer brakes remains.

Briefly, these objects are accomplished by providing a dual hydraulically-controlled, pressure-regulating valve for the tractor and trailer booster, and arranging the action of control plungers in response to hydraulic pressure from the master cylinder so that the trailer regulating valve operation is positively initiated prior to the tractor regulating valve operation. In this manner, a relay valve or booster at the trailer may be connected directly to a trailer control regulator at the tractor and the trailer brakes and will be operated in advance, even though the relay valve itself, or the booster, is of a conventional, relatively simple construction.

An object in a preferred form resides in simplification of the design and construction of the elements wherein the tractor booster and the tractor and trailer regulating control valves are all mounted in a single housing of simple construction.

Another object resides in obtaining the advantages referred to in a system wherein the tractor booster unit is air suspended, and, in a modified form, an object resides in obtaining the same advantages in a system wherein the tractor booster unit is vacuum suspended.

A further object resides in providing for manual adjustment to alter the relative operation of the regulators.

These and other objects will appear as the following detailed description of a preferred embodiment of my invention proceeds.

In the drawings:

Fig. 1 is a diagrammatic or a schematic representation of the system with the brakes off. For ease of understanding and simplification, the trailer and tractor regulators are shown as separate units separately piped to the control device, whereas in actual construction the control and regulators are all in a single housing. Likewise, various elements in the schematic are greatly simplified, the purpose of the schematic being to explain the general principles of operation only;

Fig. 2 is a similar schematic diagramming the disposition of the parts with the trailer brakes applied and the tractor brakes released;

Fig. 3 shows the pedal depressed to a point where both sets of brakes are on full;

Fig. 4 is an end view of the tractor booster or power unit and shows the tractor and trailer regulators mounted thereon;

Fig. 5 is a partial section through the booster or power unit taken on 5—5 of Fig. 4;

Fig. 6 is a section through the booster and regulator unit taken on 6—6 of Fig. 5;

Fig. 7 is a schematic diagram of a modified form wherein the tractor booster is vacuum suspended; and Fig. 8 is a section similar to Fig. 6 showing the modified regulator assembly.

Referring to the schematic diagram in Fig. 1, the brake pedal connects to a piston P in the master cylinder M of the tractor hydraulic brake system. The master cylinder M is connected by line 1 to the tractor booster unit 12 and the booster unit is connected by means of nipple 3a to a hydraulic line 3 leading to the hydraulic tractor brake cylinders. Connections 36 and 36a lead from the booster cylinder to operate control plungers 37 and 50 in the tractor and trailer regulators A and B respectively.

A source of vacuum 6, such as engine intake manifold, supplies vacuum for the regulator by means of the line indicated schematically at 7. In the actual preferred design, the regulators are in one housing with the booster which is provided with passageways for supplying vacuum to both regulators. The vacuum source also connects to a check valve C which leads, by means of line 8, to the trailer reservoir R. From the reservoir line 9 may connect to a trailer relay valve V, this valve also having a connection 10 leading to the trailer booster units and a connection 11 leading to the trailer regulator. There is also an air port in the relay valve in accordance with the conventional construction. Of course, if a vacuum suspended trailer booster is employed, the relay is omitted.

The tractor booster unit shown is of the suspended type, and includes a diaphragm piston element 23, piston rod 24, booster cylinder 25 and booster piston 27. There is also return spring 26 and air inlet port 19 leading to one side of the diaphragm 23.

A source of vacuum for the tractor booster may be supplied by a line 34 leading from the tractor regulator, it being understood that in the preferred embodiment line 34 is actually a passage in the body of the unit.

The condition of the elements in Fig. 1 with the brakes off is as illustrated on the diagram. At the tractor booster unit the tractor regulator admits air to the vacuum side of that unit, there being air on the other side at all times. In the trailer system, the trailer regulator supplies full vacuum to one connection of the air relay, and the reservoir R supplies full vacuum to the other vacuum connection of the relay. In accordance with relay construction known to the art, under these circumstances atmospheric pressure is conducted through the relay to the air suspended trailer booster units.

When the operator first depresses the pedal, pressure is transmitted directly to the wheel cylinders by means of ports 28 and 29 to take up the slack in the system. Trailer regulator spring 56 is compressed or loaded enough upon assembly of the unit so that normally plunger 50 will not move until enough pressure is developed to take up the slack. Upon further application of the brakes (as shown in Fig. 2), the plunger 50 in the trailer regulator is actuated because not only is spring 56 opposing motion of plunger 50 weaker than spring 45 opposing motion of plunger 37 in the tractor regulator, but in addition, spring 45 is loaded during assembly so that the pressure required to initiate motion of plunger 37 is insufficient to overcome the force of spring 45. Thus, a regulated quantity of air is admitted to the line 11 and hence to the relay, which causes the relay, in turn, to open the trailer booster to the vacuum source and apply the trailer brakes before the tractor brakes are applied.

Further depression of the pedal (as shown in Fig. 3) increases the hydraulic pressure in lines 36 and 36a, and, not only further depresses the trailer plunger 50, but produces a force great enough to exceed the preloading of spring 45. This depresses plunger 37 in the tractor regulator and closes the air source circuit through the tractor regulator and opens the line 34 of the booster unit to the vacuum source, thereby applying the tractor brakes in the usual manner. Of course, there are intermediate positions other than those illustrated diagrammatically whereby intermediate brake pressures can be obtained although, in any event, the trailer brakes are the first to be applied.

Structural details of one of the booster and regulator units appear in Figs. 4 to 6. The tractor booster includes a housing and cylinder unit 12 which carries the piston element 23 which preferably is in the form of a diaphragm assembly, the diaphragm being connected to a piston rod 24. The booster cylinder 25 receives the booster piston 27 mounted on a reduced end of the piston rod 24. Nipple 1a connects to line 1 from the master cylinder and nipple 3a connects to line 3 to the tractor brake cylinders. Ports 28, 29 and 31 are provided for admitting hydraulic fluid under pressure to the booster cylinder and brakes for initially taking up the slack as described in detail in the copending application of Frederick R. Allin and Frederic D. Wyss, Serial No. 33,347, filed June 16, 1948, assigned to The Weatherhead Company.

In order to return the booster piston rod 24, a spring 26 is provided in the usual manner. An air inlet 19 is provided for the air side of the air suspended booster unit. Nipple 7a (as seen in Fig. 5) is for connection to the vacuum source 6 and nipple 11a (seen in Fig. 6) is for connection to line 11 to the trailer air relay or booster. The housing for the unit has passageways and chambers for housing the tractor and trailer regulator mechanism. Passageway 36 leads from the booster cylinder to a plunger 37 for operating the tractor regulator.

The tractor regulator includes a control chamber 32 in the housing from which a passageway 33 leads to passageway 34 which (as seen in Fig. 5) connects to the vacuum side of the booster unit. The plunger 37 rigidly connects by means of member 38 to an annular member 39 that forms a port and air valve seat as well as reinforcing the central portion of the regulating diaphragm 41. Diaphragm 41 is clamped between a plate 42 and a lower bonnet or air chamber housing 43 in the usual manner.

Within the control chamber 32 a vacuum chamber 46, adapted to contain pressures other than atmospheric pressure, is formed by means of a housing section 44 cast within the chamber and having a supporting annulus (removed in the section) extending from the wall of the chamber. A vacuum chamber or port 46 connects to source of vacuum 7a by means of vacuum passageway 47 which is indicated by dot and dash lines in Fig. 6 and partially shown in Fig. 5.

A vacuum valve seat 49 is formed for vacuum port 46 and may be engaged by valve disc 48 under the force of the valve closing spring 48a. A regulating or control spring 45 engages the diaphragm member 39 and opposes the force of fluid pressure on the plunger 37, this spring being loaded at assembly to permit taking up the slack in the system as well as operation of the trailer regulator before plunger 37 moves. The tractor regulator is shown in the "brake off" position in Fig. 6, in which case the upper portion of member 39 is urged against the wall of the housing by the preloaded spring 45 and the air valve is open because diaphragm member 39 is unseated from the valve disc 48. This establishes atmospheric communication with the tractor power unit by means of the air inlet 22, the air housing 43, the port in 39, the control chamber 32, and the bore 34 leading to the vacuum side of the booster diaphragm. Thus, since air at atmospheric pressure is on both sides of the diaphragm, it assumes the position shown in Fig. 5 in response to pressure of spring 45.

The vacuum source is closed from the control chamber by engagement of valve disc 48 with the vacuum valve seat 49. When the plunger 37 is depressed due to pedal-generated pressure, the member 39 first seats on disc 48 closing the air valve and isolating the air chamber from the control chamber. Further motion of the plunger unseats vacuum valve 48 to connect the vacuum chamber to the control chamber and, hence, the tractor booster unit is open to the vacuum source. As long as the pedal is held in a given position the diaphragm operates to maintain the selected pressure. Pedal response is obtained because as soon as air valve member 39 is closed, air pressure acts upon the lower side of the diaphragm, whereas a vacuum is on the upper side of the diaphragm. This urges the plunger 37 back toward its initial position and provides a "feel" or response to the pedal by means of the hydraulic connections. The parts are proportioned so that more fluid may be supplied by the valve than is accepted behind piston 27.

The trailer regulator is mounted in the same housing as is the tractor device, and includes a plunger 50 which has a vacuum valve seat 51 connected to diaphragm 52 thereby rigidly connecting the plunger and the diaphragm so as to prevent relative motion of the diaphragm toward the plunger. The diaphragm separates the vacuum chamber 54, adapted to contain pressures other than atmospheric pressure, from the control chamber 55, vacuum chamber 54 having a passageway 47a formed suitably in the housing leading to the vacuum source bore 47 thereby independently connecting each vacuum chamber to the source of vacuum. Ports 53 establish communication between the vacuum and control chambers when the valve seat 51 is not engaged by the vacuum valve member 57. The diaphragm is engaged by a preloaded regulating spring 56 which urges the plunger 50 toward its retracted position, there being suitable stop means provided. Spring 56 is loaded so that slack in the system may be taken up before plunger 50 moves. Adjustably mounted on stem 62 of the vacuum valve 57 is the air valve 59 which engages the air valve seat 58 formed in the plate 42 separating the control chamber and the air chamber. Spring 61 closes the air valve when plunger 50 is in the brake release position, and dust cap 63 is provided so that threaded stem 62 supporting vacuum valve 57 may be adjusted to assist in proportioning the operation of the two regulators.

In the normal or "brake release" position (shown in Fig. 6), the air valve 59 is closed and the vacuum from source 47 is in communication by means of bore 47a, vacuum chamber 54, ports 53, control chamber 55 and the nipple 11a with the air relay valve so that the system is in the condition shown in Fig. 1. When plunger 50 is depressed by fluid under pressure, seat 51 engages the vacuum valve 57 and closes off the vacuum source, and further motion of plunger 50 opens air valve 59 and permits a regulated amount of air to enter the control chamber and actuate the relay valve. The increased pressure under diaphragm 52 likewise provides a "feel" or pedal for response. As mentioned before, in order that pressure in lines 36 and 36a, generated by the pedal pressure, may cause the trailer regulator to lead the action of the tractor regulator, the control or regulating spring 56 in the trailer regulator is a weaker spring than the corresponding spring 45 in the tractor regulator, and the springs are loaded so that spring 56 exerts less force against its piston than does spring 45.

With this arrangement the plunger 50 may be moved enough to close the vacuum valve and open the air valve in the trailer regulator before sufficient pressure is developed to move plunger 37. In addition lost motion is provided in the tractor regulator, and errors or changes in the spring constant may be compensated for by moving the vacuum valve 57 toward or away from the seat 51 by means of the threaded stem 62 to alter the degree of lost motion. However, if the springs are properly selected and loaded there need be no lost motion in the regulator. Thus, even though both operating plungers are subjected to the same initial pressure generated by depressing the main brake pedal, the advantages referred to previously are obtained and jackknifing is prevented, yet upon full pedal pressure both tractor and trailer brakes may be eventually completely applied. Also, the relay valve may be of standard construction because the regulator design assures that the relay valve will operate before the tractor brake booster is energized.

In the embodiment shown in Figs. 7 and 8, Fig. 7 is a diagrammatic view of a modified form wherein the tractor booster 12a is a vacuum suspended device, this type of booster having several advantages as is well known in the art. By replacing the connecting line 34 that was formerly shown connected to the control chamber of the regulator with a line 34a that connects to the vacuum source, and by replacing what was formerly the air inlet 19 by line 19a connected to the control chamber of the regulator, a vacuum suspended booster is provided. The trailer regulator is unchanged in the modified form previously described.

The tractor regulator is a substantial duplicate of the trailer regulator and, in the drawings, the corresponding elements are given the same reference characters with the addition of the subscript a. The connections at the tractor regulator are somewhat different from those shown in Fig. 6, in that a passage 33a leads from the vacuum chamber thereof to the line 34a and hence to the vacuum side of the booster unit. The control chamber connects to line 19a leading to the variable pressure side of the booster unit. The regulating spring 56a is stronger than the corresponding spring 56 in the trailer regulator and the springs are loaded so that the control plunger 37a in the tractor device lags the operation of the trailer plunger 50.

When the brake pedal is depressed, the operation of the trailer device is like that previously described. After the tractor regulator comes into operation, the control chamber 55a, which was formerly connected to the vacuum source, is connected to the air chamber by the opening of the air valve 59a. The regulated pressure increase produced in the control chamber is transmitted by means of line 19a to the variable pressure side of the booster unit. This causes operation of the tractor booster unit in the usual manner, but tractor brake operation lags the operation of the trailer brake system. This form illustrates an important advantage of the invention. Since reliance for producing lead is not placed upon the relay valve, the relay valve may be dispensed with entirely and direct connections made to a vacuum suspended trailer booster.

Although a simpler design with fewer connections is provided, when both regulators are incorporated with the booster unit the mode of operation is the same if one or both regulators are separate from the booster unit with proper fluid connections being fitted.

Having completed a detailed description of two embodiments of my invention, it can be seen that the jackknifing is prevented by a simple combination of elements that proportion the effectiveness of the hydraulic operating pressure and its ability to control respective regulators. If an air relay valve is used, it may be of standard construction, or a vacuum suspended booster may be connected indirectly. No mechanism or regulators that must discriminate between delicate differences in comparative air pressures are required, nor are proportioning valves and other complicated devices needed to produce the desired results. The combination facilitates mounting of all the control elements in a single housing which includes the tractor booster unit.

Although a detailed description of a preferred and modified embodiment of my invention has been given, it will be apparent that various modifications are possible without affecting the mode of operation, and, accordingly, it is contemplated that the appended claims and not the aforesaid embodiment shall determine the scope of my invention.

What is claimed is:

1. For use in a tractor-trailer braking system having a pressure differential power device for operating the tractor brakes, a pressure differential power device for actuating the trailer brakes, an operator controlled source of liquid under pressure for controlling both devices, and a source of air at non-atmospheric pressure; a pneumatic regulating valve for connection to each power device and to said air pressure source, hydraulic valve operating motor means associated with each valve, said motor means having a common hydraulic connection with said liquid pressure source, each of said pneumatic valves including a control chamber bounded by a single diaphragm, a pair of ports leading to said control chamber adapted for independent connection with the atmosphere and with the source of air at non-atmospheric pressure, unitarily moving valves for said ports, means for causing motion of said single diaphragm to operate both of said valves, means rigidly connecting said hydraulic motor to said diaphragm, resilient means engaging each diaphragm and associated valve operating motor arranged to oppose the force of said liquid pressure source, one of said hydraulic motor means and its associated resilient means being arranged to respond to a lower pressure than does the other of said hydraulic motor means and its associated resilient means, means for connecting the control chamber of one valve to the tractor brake operator and means for connecting the control chamber of the other valve to the trailer brake operator.

2. For use in a tractor-trailer braking system having a pressure differential power device for operating the tractor brakes, a pressure differential power device for actuating the trailer brakes, an operator controlled source of liquid under pressure for controlling both devices, and a source of air at non-atmospheric pressure; a pneumatic regulating valve for connection to each power device and to said air pressure source, hydraulic valve operating motor means associated with each valve, said motor means having a common hydraulic connection with said liquid pressure source, each of said pneumatic valves including a control chamber bounded by a single diaphragm, a pair of ports leading to said control chamber adapted for independent connection with the atmosphere and with the source of air at non-atmospheric pressure, unitarily moving valves for said ports, means for causing motion of said single diaphragm to operate both of said valves, means rigidly connecting said hydraulic motor to said diaphragm, resilient means engaging each diaphragm and associated valve operating motor arranged to oppose the force of said liquid pressure source, said trailer hydraulic motor means and its associated resilient means being arranged to respond to a lower pressure than does the tractor hydraulic motor means and its associated resilient means, means for connecting the control chamber of one valve to the tractor brake operator and means for connecting the control chamber of the other valve to the trailer brake operator.

3. For use on a tractor-trailer braking system having a pressure differential power device for operating the tractor brakes, a pressure differential power device for actuating the trailer brakes, an operator controlled source of liquid under pressure for controlling both devices, and a source of air at non-atmospheric pressure; a pneumatic regulating valve for connection to each power device and to said air pressure source, hydraulic valve operating motor means associated with each valve, said motor means having a common hydraulic connection with said liquid pressure source, each of said pneumatic valves including a control chamber bounded by a single diaphragm, a pair of ports leading to said control chamber adapted for independent connection with the atmosphere and with the source of air at non-atmospheric pressure, unitarily moving valves for said ports, means for causing motion of said single diaphragm to operate both of said valves, means rigidly connecting said hydraulic motor to said diaphragm, resilient means engaging each diaphragm and associated valve operating motor arranged to oppose the force of said liquid pressure source, the resilient means for said tractor hydraulic motor means being stronger than the resilient means for said trailer hydraulic motor means, means for connecting the control chamber of one valve to the tractor brake operator and means for connecting the control chamber of the other valve to the trailer brake operator.

4. In a tractor-trailer braking system having a pressure differential power device for operating the tractor brakes, a pressure differential power device for actuating the trailer brakes, an operator controlled source of liquid under pressure for controlling both devices, and a source of air at non-atmospheric pressure, a pneumatic regulating valve connected to each power device and to said air pressure source, hydraulic valve operating motor means associated with each valve, said motor means having a common hydraulic connection with said liquid pressure source, each of said pneumatic valves including a control chamber bounded by a single diaphragm, a pair of ports leading to said control chamber independently connected with the atmosphere and with the source of air at non-atmospheric pressure, unitarily moving valves for said ports, means for causing motion of said single diaphragm to operate both of said valves, means rigidly connecting said hydraulic motor to said diaphragm, resilient means engaging each diaphragm and associated valve operating motor arranged to oppose the force of said liquid pressure source, said trailer hydraulic motor means and its associated resilient means being arranged to respond to a lower pressure than does the tractor hydraulic motor means and its associated resilient means, means for connecting the control chamber of one valve to the tractor brake operator and means for connecting the control chamber of the other valve to the trailer brake operator.

5. In a tractor-trailer braking system having a pressure differential power device for operating the tractor brakes, a pressure differential power device for actuating the trailer brakes, on operator controlled source of liquid under pressure for controlling both devices, and a source of air at non-atmospheric pressure, a pneumatic regulating valve connected to each power device and to said air pressure source, hydraulic valve operating motor means associated with each valve, said motor means having a common hydraulic connection with said liquid pressure source, each of said pneumatic valves including a control chamber bounded by a single diaphragm, a pair of ports leading to said control chamber independently connected with the atmosphere and with the source of air at non-atmospheric pressure, unitarily moving valves for said ports, means for causing motion of said single diaphragm to operate both of said valves, means rigidly connecting said hydraulic motor to said diaphragm, resilient means engaging each diaphragm and associated valve operating motor arranged to oppose the force of said liquid pressure source, the resilient means for the tractor regulating valve being preloaded and stronger than the resilient means for the trailer regulator, means for connecting the control chamber of one valve to the tractor brake operator and means for connecting the control chamber of he other valve to the trailer brake operator.

6. For use on a tractor-trailer braking system having a pressure differential brake operating means for operating the tractor brakes, a pressure differential brake operating means for actuating the trailer brakes, an operator controlled source of liquid under pressure for controlling both devices, and a source of air at non-atmospheric pressure; a pair of regulators, each regulator having a source chamber for independent connection to the source of air at non-atmospheric pressure, a control chamber for connection to one brake operating means, and an atmosphere chamber, a first port for connecting said source and control chambers, first valve means for said first port, a second port for connecting said atmosphere and control chambers, second valve means for said second port movable with said first valve means, a diaphragm between said control and one of said other chambers, one of said ports being formed in said diaphragm, a pair of hydraulic plungers for common connection to the source of liquid under pressure, means rigidly connecting said diaphragm and plunger whereby liquid pressure in said hydraulic connection moves the plunger, diaphragm and both valve means closing the port in the diaphragm and opening the other port and resilient means engaging said diaphragm to oppose the action hydraulic pressure on said plunger; said plungers and associated resilient means being formed so that one plunger moves farther than the other in response to a common hydraulic pressure on the plungers.

7. Discriminating control regulator means for use in a tractor-trailer brake system comprising a reservoir means containing pressure other than atmospheric pressure, tractor and trailer brake operating means, a tractor regulator and a trailer regulator, each regulator formed with an atmospheric source chamber open to atmospheric pressure, a pressure chamber, and a control chamber connected to the respective tractor and trailer brake operating means, pressure lines independently connecting said pressure chambers to said reservoir means, valve means in each regulator between each of said first two chambers and the control chamber, diaphragm means including a valved port in each regulator between the control chamber and one of the other chambers, hydraulic motor means rigidly connected to each diaphragm, and bias means engaging each diaphragm urging the diaphragm for motion in opposition to that imparted by the associated hydraulic motor means, means for connecting said hydraulic motor means to a common source of pressure, one of said hydraulic motor means and its corresponding bias means responding to a lower pressure than does the other hydraulic motor means and its corresponding bias means.

8. Discriminating control regulator means for use in a tractor-trailer brake system comprising a reservoir means containing pressure other than atmospheric pressure, tractor and trailer brake operating means, a tractor regulator and a trailer regulator, each regulator formed with an atmospheric source chamber open to atmospheric pressure, a pressure chamber, and a control chamber connected to the respective tractor and trailer brake operating means, pressure lines independently connecting said pressure chambers to said reservoir means, valve means in each regulator between each of said first two chambers, and the control chamber, diaphragm means including a valved port in each regulator between the control chamber and one of the other chambers, hydraulic motor means rigidly connected to each diaphragm, and bias means engaging each diaphragm urging the diaphragm for motion in opposition to that imparted by the associated hydraulic motor means, means for connecting said hydraulic motor means to a common source of pressure, said trailer hydraulic motor means and bias means responding to a lower pressure than does the tractor hydraulic motor means and bias means.

9. Discriminating control regulator means for use in a tractor-trailer brake system comprising a reservoir means containing pressure other than atmospheric pressure, tractor and trailer brake operating means, a tractor regulator and a trailer regulator, each regulator formed with an atmospheric source chamber open to atmospheric pressure, a pressure chamber, and a control chamber connected to the respective tractor and trailer brake operating means, pressure lines independently connecting said pressure chambers to said reservoir means, valve means in each regulator between each of said first two chambers and the control chamber, diaphragm means including a valved port in each regulator between the control chamber and one of the other chambers, hydraulic motor means connected to each diaphragm, and bias means engaging each diaphragm urging the diagram for motion in opposition to that imparted by the associated hydraulic motor means, the bias means of the tractor regulator being stronger than the bias means of the trailer regulator.

10. Discriminating control regulator means for use in a tractor-trailer brake system comprising a reservoir means containing pressure at subatmospheric pressure, tractor and trailer brake operating means, a tractor regulator and a trailer regulator, each regulator formed with an atmospheric source chamber open to atmospheric pressure, a pressure chamber, and a control chamber connected to the respective tractor and trailer brake operating means, pressure lines independently connecting said pressure chambers to said reservoir means, valve means in each regulator between each of said first two chambers and the control chamber, diaphragm means including a valved port in each regulator between the control chamber and one of the other chambers, hydraulic motor means rigidly connected to each diaphragm, and bias means engaging each diaphragm urging the diaphragm for motion in opposition to that imparted by the associated hydraulic motor means, means for connecting said hydraulic motor means to a common source of pressure, said trailer hydraulic motor means and bias means responding to a lower pressure than does the tractor hydraulic motor means and bias means.

11. Discriminating control regulator means for use in a tractor-trailer brake system comprising a reservoir means containing fluid under a vacuum, tractor and trailer brake operating means, a tractor regulator and a trailer regulator, each regulator formed with an atmospheric source chamber open to atmospheric pressure, a pressure chamber, and a control chamber connected to the respective tractor and trailer brake operating means, pressure lines independently connecting said pressure chambers to said reservoir means, air and vacuum valve means in each regulator between the atmosphere and vacuum chambers respectively and the control chamber, diaphragm means including a valved port in each regulator between the control chamber and one of the other chambers, hydraulic motor means rigidly connected to each diaphragm, and bias means engaging each diaphragm urging the diaphragm for motion in opposition to that imparted by the associated hydraulic motor means, said trailer hydraulic motor means and bias means responding to a lower pressure than does the tractor hydraulic motor means and bias means, the air and vacuum valve means in the trailer regulator being respectively normally closed and normally open, the air and vacuum means in the tractor regulator being respectively normally open and normally closed.

12. Discriminating control regulator means for use in a tractor-trailer brake system comprising a reservoir means containing fluid under a vacuum, tractor and trailer brake operating means, a tractor regulator and a trailer regulator, each regulator formed with an atmospheric source chamber open to atmospheric pressure, a pressure chamber, and a control chamber connected to the respective tractor and trailer brake operating means, pressure lines independently connecting said pressure chambers to said reservoir means, air and vacuum valve means in each regulator between the atmosphere and vacuum chambers respectively and the control chamber, diaphragm means including a valved port in each regulator between the control chamber and one of the other chambers, hydraulic motor means rigidly connected to each diaphragm, and bias means engaging each diaphragm urging the diaphragm for motion in opposition to that imparted by the associated hydraulic motor means, said trailer hydraulic motor means and bias means responding to a lower pressure than does the tractor hydraulic motor means and bias means, the air and vacuum valve means in both regulators being respectively normally closed and normally open.

FREDERICK R. ALLIN.
FREDERIC D. WYSS.

References Cited in the file of this patent

UNITED STATES PATENTS

| Number | Name | Date |
|---|---|---|
| 2,353,755 | Price | July 18, 1944 |
| 2,429,194 | Price | Oct. 14, 1947 |